United States Patent [19]

Hansen

[11] 4,148,938
[45] Apr. 10, 1979

[54] PROTECTING PAVEMENT MATERIALS AGAINST THE EFFECTS OF FREEZING AND THAWING OF WATER OR BRINE SOLUTIONS

[76] Inventor: Charles N. Hansen, 1448 S. 17th East, Salt Lake City, Utah 84108

[21] Appl. No.: 783,113

[22] Filed: Mar. 31, 1977

Related U.S. Application Data

[63] Continuation-in-part of Ser. No. 544,589, Jan. 27, 1975, abandoned, which is a continuation of Ser. No. 397,495, Sep. 14, 1973, abandoned.

[51] Int. Cl.² ............................ B05C 1/16; C09K 3/18
[52] U.S. Cl. ...................................... 427/136; 106/13; 252/70; 404/75; 427/372 R
[58] Field of Search ............. 427/136, 372 R; 106/13, 106/194, 197 C; 404/75; 252/70

[56] References Cited

U.S. PATENT DOCUMENTS

| | | | |
|---|---|---|---|
| 2,154,220 | 4/1939 | Sponsel | 427/339 |
| 2,192,320 | 3/1940 | McCarthy | 252/70 |
| 2,570,827 | 10/1951 | Madison et al. | 106/197 |
| 2,731,353 | 1/1956 | Fain et al. | 106/194 |
| 2,948,625 | 8/1960 | MacKenzie | 106/13 |
| 2,980,620 | 4/1961 | Hatch | 106/13 |
| 3,185,648 | 5/1965 | Standish et al. | 106/13 |
| 3,227,654 | 1/1966 | Standish et al. | 252/70 |
| 3,297,577 | 1/1967 | Standish et al. | 252/70 |
| 3,556,718 | 1/1971 | Bachmann et al. | 252/70 |
| 3,630,913 | 12/1971 | Scott et al. | 106/13 |
| 3,711,409 | 1/1973 | Ayres et al. | 252/70 |

FOREIGN PATENT DOCUMENTS 2124091 11/1972 Fed. Rep. of Germany ............. 106/13

OTHER PUBLICATIONS

Chemical Abstracts, vol. 71: 84296c, 1969.
Chemical Abstracts, vol. 73: 123244x, 1970.

Primary Examiner—Ronald H. Smith
Assistant Examiner—Sadie L. Childs
Attorney, Agent, or Firm—Dowell & Dowell

[57] ABSTRACT

Compositions of carboxy methyl cellulose and method for treating cured concrete and bituminous concrete, the surfaces of which are subject to the accumulation of water, melting ice and snow, to reduce spalling or degradation of such surfaces when subjected to the freezing and thawing action of the water and water based solutions which are absorbed into the same. A protecting agent is used to maintain the carboxy methyl cellulose in a soluble state when applied to concrete surfaces.

23 Claims, 3 Drawing Figures

FIG. 1

FIG. 2   PPM SODIUM CARBOXY METHYL CELLULOSE

PPM SODIUM CARBOXY METHYL CELLULOSE

FIG. 3

PROTECTING PAVEMENT MATERIALS AGAINST THE EFFECTS OF FREEZING AND THAWING OF WATER OR BRINE SOLUTIONS

CROSS REFERENCE TO RELATED APPLICATIONS

This application is a continuation-in-part of Ser. No. 544,589 filed Jan. 27, 1975, now abandoned, which was a continuation of Ser. No. 397,495 filed Sept. 14, 1973, now abandoned.

BACKGROUND OF THE INVENTION

1. Field of the Invention

This invention relates generally to compositions which may be applied to the surface of highway pavements, sidewalks, patios and other concrete and bituminous concrete structures to protect such structures from destructive surface spalling which results when the pores of such structures are subjected to stresses created by the expansion and contraction of water or water based solutions during a freeze-thaw cycle. More specifically, this invention is directed to compositions, methods and surface applications of carboxy methyl cellulose to concrete surfaces during ice and snow removal operations in order to decrease the amount of surface deterioration which occurs as the liquids which are covering or absorbed into such surfaces are subjected to cycles of freezing and above freezing temperatures.

2. History of the Prior Art

One of the greatest problems of maintaining concrete, primarily when in the form of walkways, roads, and highways, is the rate at which the concrete breaks up. The cost of repairs and replacement of such concrete amounts to millions of dollars each year.

Much research has been done in an attempt to protect concrete surfaces which are subjected to being flooded or covered by water from the spalling effect which results from repeated freeze-thaw cycles of the water in response to climatic conditions. Most of this work has been done in the field of developing protective coatings and through the use of air-entrained concrete. However, little effort has been directed to developing compounds which could be applied to a concrete surface in the presence of ice, snow, water or water based solutions containing de-icing salts, urea and the like.

The surface spalling of concrete is a result of the stresses created in water, which has soaked into the surface pores of the concrete, is expanded as the ambient temperature drops below freezing. If during the repeated cycle of freezing and thawing of the water within the pores of the concrete, these stresses should exceed the yield point, the surface will become cracked and chipped.

Further, it is well known in the concrete industry that the use of many de-icing compounds, such as a common road salt, may actually increase the rate of surface spalling dependent upon the particular type of concrete involved and the resultant concentration of salt solution involved. When de-icing salts and de-icing solutions are used to melt snow or ice on a concrete surface, the ice or snow is changed to a liquid state and forms brine solutions which may vary from about zero percent brine to a saturated brine solution. When the air temperature becomes sufficiently low, the solution which has been absorbed into the concrete expands upon being frozen and creates a stress in the concrete. Again, if the stress exceeds the yield point, the concrete fractures and spalling occurs.

Although research substantiates the fact that salt increases the rate of spalling of non-air-entrained concrete, it also shows that salt decreases the rate of spalling of air-entrained concrete. Example 5 of the preferred embodiment shows that a 2.5% salt solution caused the non-air-entrained concrete to spall about 1.9 times as fast as did distilled water. However, in Example 6, distilled water spalls air-entrained concrete about 4.4 times as fast as a 1% salt solution in 395 freeze-thaw cycles and about 3.9 times as fast as a 2.5% salt solution in 919 freeze-thaw cycles, Example 7. Therefore, when applied to an air-entrained concrete, salt shows some degree of protecting action toward the reduction of the spalling which is caused by the freezing and thawing solutions which are in contact with or absorbed into the concrete.

In view of the foregoing, it is often the case that during conventional snow and ice removal operations, conditions are created which may be deleterious to the concrete surface. The Operator, Snow Fighter's Handbook for the Utah State Department of Highways, gives the following description of a method for maintaining bare highways during snowfall: "Begin salt application when the ground is BARELY WHITE and it is wet enough to hold the salt on the roadbed. It is really important that the salt is applied at this time because you are doing more than just applying salt—you are forming a brine cushion to 'float' the snow layer on. This brine has two purposes: 1—It melts snow from the pavement up so that snow and ice don't stick to it, and 2—It 'greases' the snow layer so that the snow plows can push it off the road more completely than without it." However, the presence of the brine solution within the pores of the concrete surface as the temperature falls creates a condition which may lead to surface spalling of non-air-entrained concrete.

Similar conditions are established by recommended de-icing operations for sidewalks. In the February 1973 issue of "Consumer Reports" is found the following directions for keeping the snow off of a sidewalk: "The temperature is within a couple of degrees of freezing, wet snow is falling and the forecast is for a total accumulation of two inches: Spread rock salt or calcium chloride at about one cup per square yard to melt the snow as it falls, or shovel."

The Portland Cement Association published in 1968 the "Concrete Information" pamphlet titled "Effect of Various Substances on Concrete and Protective Treatments, Where Required." This pamphlet is a recognized source of information on the known effects that many chemicals have on concrete. With the exception of protective coatings, no mention is made in the pamphlet of any chemical which would protect concrete against the deleterious effects which either freezing and thawing or any chemical may have on concrete. The following, however, is said of sodium and calcium chloride: "Frequently used as a de-icer for concrete pavements. If the concrete contains insufficient entrained air or has not been air dried for at least 30 days after completion of curing, repeated application may cause surface scaling." Further under the heading of Miscellaneous, the following statement is made: "Chlorides (calcium and sodium), urea and ethyl alcohol cause scaling of non-air-entrained concrete."

In order to combat the damaging effects to concrete from de-icers, the pamphlet lists the following protective coatings: "50% solution of boiled linseed oil in kerosene, soybean oil, modified castor oil, sand filled epoxy or coal-tar epoxy."

In addition to the aforementioned conditions, many factors affect the rate at which concrete, under freeze-thaw conditions, may break up. Some of these factors are the relative amounts of aggregate, water and cement in a batch of concrete, the amount of mixing given to a batch of concrete, the amount of agitation given to the concrete after it is in place and before it has set, the chemical composition of the cement, the fineness of the cement, the conditions under which the concrete is cured; the conditions under which the concrete is allowed to dry, the amount of water that is held in contact with concrete during the freeze-thaw cycle, the lowest temperature attained in the freeze-thaw cycle, and the number of freeze-thaw cycles to which the concrete is subjected.

As the use of chemical de-icing compounds is widespread in snow or ice removal operations, it would be extremely beneficial to provide some additive or other means by which the concrete pavements and other such surfaces could be protected from the spalling due to the presence of water or various solutions which result from melting ice and snow.

Further, due to the time, available equipment, and expense involved, it would be advantageous to apply a spalling protective agent simultaneously with conventional road salting or spreading operations.

Some examples of the prior art include:

U.S. Pat. Nos. 2,154,220 to Sponsel, 2,192,320 to McCarthy, 2,570,827 to Madison et al, 2,731,353 to Fain et al, 2,948,625 to MacKenzie, and 3,556,718 to Bachmann et al, and publications Chemical Abstracts, Vol. 71:84296c, 1969 and Chemical Abstracts, Vol. 73:123244x, 1970.

SUMMARY OF THE INVENTION

A composition and method for applying carboxyl methyl cellulose to a concrete or bituminous concrete pavement, sidewalk, patio or the like during an ice or snow storm to reduce the possibility of surface spalling. The composition includes a sodium carboxy methyl cellulose which may be blended with a protecting agent such as soda ash, the latter being effective in precipitating, sequestering or chelating calcium ions in the concrete and thereby prevents the formation of an insoluble calcium carboxy methyl cellulose. The composition of carboxy methyl cellulose with or without a protecting agent may be admixed for application or applied in addition to a conventional de-icing composition such as a urea or sodium chloride to a snow, water or ice covered surface at such a time that the carboxy methyl cellulose is present and soluble when a freezing action occurs.

It is the purpose of this invention to provide a method of reducing the surface spalling of concrete highways and the like by applying a soluble carboxy methyl cellulose to the concrete when ice, snow, or water is in contact therewith, or when water based solutions have impregnated such concrete and will be subjected to sufficiently low temperatures to cause such solutions to freeze.

It is another object of this invention to provide a composition including carboxy methyl cellulose for reducing the surface spalling of concrete caused by the stresses developed within the pores of the concrete due to the presence of water when ambient temperatures are sufficiently low to cause a freeze and which includes an ingredient for reacting with calcium and other ions present in the concrete to insure that the carboxy methyl cellulose remains soluble.

It is a further object of the invention to blend a conventional de-icing reagent, such as urea or sodium chloride, with a soluble carboxy methyl cellulose in order to produce a de-icing composition which will both aid in melting snow or ice on a highway pavement, or the like, as well as reduce the amount of surface spalling of the pavement during a freeze-thaw cycle.

It is another object of this invention to provide a method of coating a road salt or urea with a methyl cellulose so that a dry product is obtained which can be spread on roadway or other such surfaces with conventional spreading equipment during an ice or snow storm to thereby protect against surface icing and simultaneously reduce surface spalling.

DESCRIPTION OF THE PREFERRED EMBODIMENT

As previously noted, spalling damage to concrete and bituminous concrete surfaces is a result of the freezing of water or water based solutions within the pores of the concrete and results in millions of dollars of damage each year. Further, the application of road salts, urea and other de-icing chemicals to highways, sidewalks and the like to prevent icing conditions may often create additional problems dependent upon the type of concrete encountered.

Also, some pavement surfaces are more prone to degradation than others. For example, non-air-entrained concrete breaks up more rapidly than does air-entrained concrete. Bituminous concrete is also prone to degrade. The present invention was thus tested on those pavement surfaces which are known to have a tendency to degrade.

It has been found, however, that carboxy methyl cellulose has the property of reducing the amount of breakup which occurs when any concrete is subjected to the freezing and thawing of water or the freezing and thawing of brine. With reference to the examples which follow, Example 1 discloses a solution containing 250 ppm of sodium carboxy methyl cellulose in distilled water which was used in a freeze-thaw test and compared with the effect of plain distilled water. It was found that the concrete test piece in the distilled water spalled about 1.6 times as fast as the concrete piece in the solution containing the distilled water plus 250 ppm of sodium carboxy methyl cellulose.

Due to the deleterious effects of salts and other de-icing compounds upon non-air-entrained concrete, the addition of carboxy methyl cellulose was tested to determine its effect upon surface spalling subject to the presence of a brine solution. In Example 2, which follows, the rate of spalling in a plain 1% salt solution is about 1.2 times as fast as in a 1% salt solution containing 250 ppm of sodium carboxy methyl cellulose.

Figure 3:
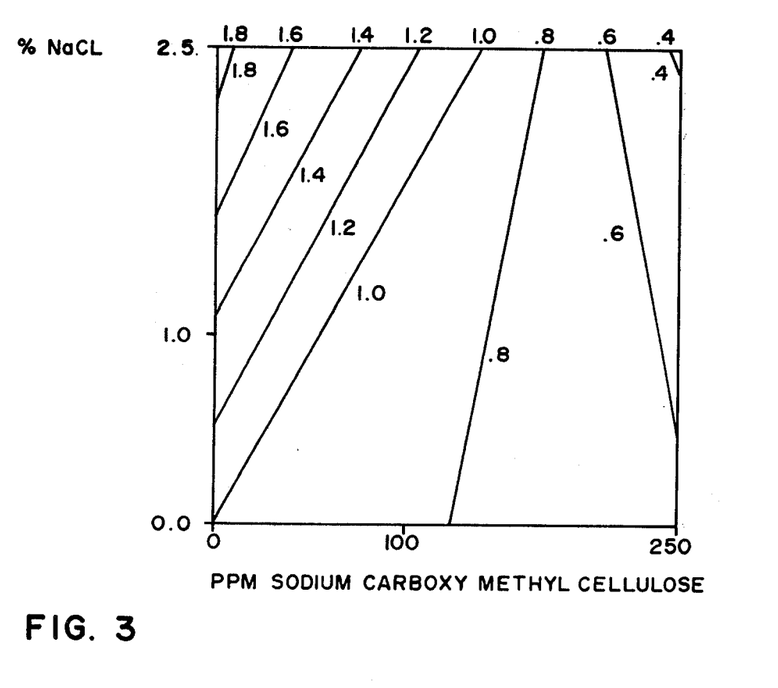
FIG. 3 is a graph of the grams of spalling on a non-air-entrained concrete for various ratios of sodium carboxy methyl cellulose to salt solution.

In order to demonstrate the deleterious effect of salt on non-air-entrained concrete and the resultant effect of additions of varying amounts of carboxy methyl cellulose, a series of tests were made and are reflected in FIG. 3 of the drawing. It should be noted that when the carboxy methyl cellulose is present in amounts less than approximately 150 to 250 ppm, the amount of spalling for a fixed amount of carboxy methyl cellulose is increased with an increasing concentration of salt. However, the graph shows that although salt has a deleterious effect on the non-air-entrained concrete with low salt concentrations, when concentrations reach as high as 23.1% salt in solution, the effect of the salt is reversed and becomes additive. (See Example 8)

Figure 2:
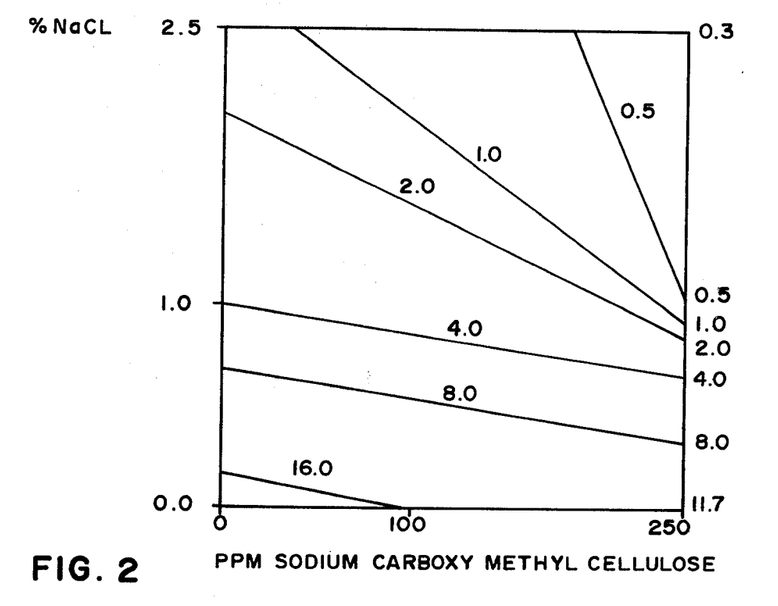
FIG. 2 is a graph of the grams of spalling on an air-entrained concrete for various ratios of sodium carboxy methyl cellulose to salt solution.

When utilizing a salt solution with air-entrained concrete, on the other hand, it was found that in addition to the reduction of spalling, as previously noted, it was also shown to have an additive beneficial effect when used in combination with a carboxy methyl cellulose solution. This additive effect of the salt plus carboxy methyl cellulose is illustrated by FIG. 2 of the drawing. The graph of FIG. 2 shows the percent of salt for each test along the ordinate and the ppm of sodium carboxy methyl cellulose along the abscissa. By plotting constant spalling lines on this graph, it can be seen that both salt and carboxy methyl cellulose reduce the rate of spalling and that their effects are additive. At a sodium carboxy methyl cellulose concentration of 250 ppm, 11.7 grams of spallings were produced at 0% salt, 0.5 grams of spallings at 1% salt and 0.3 grams of spallings at 2.5% salt.

Some of the results of the tests that were conducted utilizing varying amounts of carboxy methyl cellulose are reflected in Examples 1-27. These examples will be referred to throughout the remainder of this specification.

As to the amount of carboxy methyl cellulose to be used, it was shown in several groups of tests that 100 ppm of sodium carboxy methyl cellulose did not give as much protection against concrete breakup as did 250 ppm. Example 4 at 100 ppm of sodium carboxy methyl cellulose saved 52% of the loss to spalling, while Example 3 at 250 ppm of sodium carboxy methyl cellulose saved 80% of the spalling loss. Example 6 shows 250 ppm saved 83% of the spalling loss, while 100 ppm saved only 62% of the spalling loss. "Spalling loss" refers to the grams of material disassociated from the test cylinder due to spalling.

In Example 9 a high level 10,000 ppm of sodium carboxy methyl cellulose saved 99% of the spalling loss. Example 10 shows that 9,840 ppm with a 2.5% equivalent salt concentration saved 98% of the spalling loss.

A separate test on a bituminous concrete, Example 11, showed that 250 ppm of sodium carboxy methyl cellulose saved 98% of the weight loss, while 175 ppm saved 96%.

From the preceding paragraphs, it is noted that, generally, the greater the carboxy methyl cellulose concentration, the greater the protection against concrete surface spalling. If one were to plot the previous Examples 3, 4, 6, 9, and 10, the effect of additional carboxy methyl cellulose would be continuous. That is, when carboxy methyl cellulose is absent, there is no effect; however, at 100 ppm a reduction in spalling of approximately 60% is achieved. By graphing the results of various amounts of carboxy methyl cellulose added, one could interpolate that for a 6% spalling reduction, 10 ppm would be necessary, and for 0.6% reduction 6 ppm would be required.

Although increased amounts of carboxy methyl cellulose will give added protection against surface breakup, economies must be considered in use and therefore material cost is a limiting factor.

In conducting tests of the effects of sodium carboxy methyl cellulose as applied to concrete structures, it was found that the calcium which is contained in portland concrete caused the carboxy methyl cellulose to precipitate as a calcium carboxy methyl cellulose and thus to lose some, but not all, of its effectiveness.

It was therefore necessary to find some means by which the divalent calcium ions, and possibly other multivalent ions, could be prevented from reacting with the carboxy methyl cellulose and thereby form an insoluble compound of carboxy methyl cellulose which would precipitate out of solution. By enabling the carboxy methyl cellulose to remain soluble, the net beneficial effect of the carboxy methyl cellulose against surface spalling would be increased. Several agents were tried and found to be effective in preventing the calcium and other multivalent cations in the concrete from precipitating the carboxy methyl cellulose. The protecting agents function by either precipitating, sequestering or chelating the calcium which is in the solution, thus effectively removing the calcium from the solution and in turn maintaining the carboxy methyl cellulose in a soluble state when in solution. Similarly, other multivalent cations which may be present are also prevented from reacting with the carboxy methyl cellulose to form an insoluble compound.

In conducting tests to determine which additives or agents would offer the greatest protection against the formation of an insoluble carboxy methyl cellulose, it was noted that although various chemicals did react with calcium and other multivalent ions, they also had an effect on the concrete itself. Also, various chemical additives were found to have a greater affinity for the calcium and were thus more desirable.

Sodium carbonate (soda ash) was used as the main protecting agent for this work. Soda ash is inexpensive, it is alkaline and compatible with the alkaline characteristics of a concrete system, and it is not harmful to concrete. Further, the calcium carbonate which is precipitated has a very low solubility (the solubility product constant of calcium carbonate is $9.9 \times 10^{-9}$) and, most significantly, sodium carbonate is effective as a protecting agent in preventing the calcium and other multivalent cations in the concrete from reacting with the carboxy methyl cellulose.

Examples 1 and 2 reflect the increased spalling protection attainable when a protecting agent, such as soda ash, is combined with the sodium carboxy methyl cellulose for application to a concrete surface. Examples 1, 9-14, 19-27 show tests utilizing soda ash as the protecting agent.

Although soda ash is a preferred agent due to its cost and other aforementioned characteristics, other organic and inorganic precipitating, sequestering and chelating agents could be used. Other inorganic precipitating agents include salts and acids of anions comprising aluminates, alumino silicates, arsenates, borates, borides, carbonates, fluorides, flurosilicates, hydroxides, molybdates, phosphates, silicates, sulfates, sulfides, sulfites, and tungstates. Example 16 shows the use of disodium phosphate as an organic protecting agent for precipitating calcium and other multivalent cations. Note that approximately twice as much disodium phosphate was necessary to achieve the same effect as compared to the use of soda ash in Example 14.

Various inorganic sequestering agents which may be used include salts and acids of polyphosphates comprising tetrasodium, tetrapotassium pyrophosphate, sodium tripoly phosphate, potassium tripoly phosphate, sodium tetraphosphate, potassium tetraphosphate, sodium hexameta phosphate, potassium hexameta phosphate, sodium acid pyrophosphate and potassium acid pyrophosphate. Example 15 shows the use of tetrasodium phosphate as an inorganic protecting agent for sequestering calcium and other multivalent cations. Again, note the need for an increased amount of protecting agent compared to the use of soda ash in Example 14.

In addition to the inorganic compounds, various organic agents may be used to precipitate, sequester or chelate the calcium and other harmful cations. Example 17 shows the use of tetrasodium salt of ethylenediamine tetra acetic acid as a chelating agent in an amount similar to that of tetrasodium phosphate in Example 15. Other organic chelating or sequestering agents include other salts and acids of ethylene diamine tetraacetic acid, nitrilotriacetic acid, trisodium and tripotassium hydroxyethyl ethylene diamine triacetate, pentasodium salt of diethylene triamine pentaacetic acid, gluconates, and citrates.

Example 18 discloses the use of sodium oxalate as an organic precipitating agent in an amount similar to Example 16. Other organic precipitating agents include salts and acids of laurates, linoleates, oleates, other oxalates, palmitates, and stearates.

As noted by the variety in the amounts of protecting agent necessary to achieve the same end result, and as differences exist between the effectiveness of the various protecting agents dependent upon how tightly the precipitates, sequestered or chelated calcium or other multivalent ion, is held by a particular compound or agent, together with the possible harm to the concrete by the agent and the costs involved, sodium carbonate is the preferred protecting agent.

When preparing a composition containing the protective agent for use in applications to ice, snow, or slush covered concrete highways, sidewalks, patios and the like, it is desirable to insure that the protective agent is present in sufficient quantity to permit most of the carboxyl methyl cellulose to remain soluble. Most of the examples in which a road salt or urea may be present show an optimum ratio of 1.0 part sodium carboxy methyl cellulose to 1.2 parts of the protecting agent, preferably soda ash. However, ratios of 1 to 1 and 1 to 1.5 of sodium carboxy methyl cellulose to protecting agent are shown as effective in Examples 21-26, in which the cellulose and protecting agent are blended with urea or salt and urea.

In Example 5, however, 3,000 ppm of the soda ash protective agent were used with 250 ppm of sodium carboxy methyl cellulose. This ratio of 12 to 1 is found to provide an upper limit upon the ratio of the protective agent to the carboxy methyl cellulose when the same are used where a road salt is the primary de-icing compound present. Generally, as the ratio of protective agent to cellulose falls below approximately 1 to 1 ratio and less protective agent is available, the effectiveness of the sodium carboxy methyl cellulose to protect the concrete surface against spalling is decreased.

With reference to Example 9, a test was made using carboxy methyl cellulose and a protecting agent (soda ash) present in amounts up to 45 and 55 percent by weight of the mixture, respectively. As noted, the test showed a 99 percent reduction in spalling over a 1% salt solution. Thus, by applying a mixture of carboxy methyl cellulose and protecting agent to a non-air-entrained highway surface over which salt has been deposited to melt snow and ice, a marked reduction in the damage to the surface as a result of a freeze-thaw cycle can be achieved. Further, although this example reflects a ratio of approximately 1.2 to 1.0 of protecting agent to carboxy methyl cellulose, other ratios could be used. Example 10 reflects similar results at increased salt concentrations.

Example 4 reflects a generally lower range of acceptable limits of protecting agent and carboxy methyl cellulose. The tests in this example were made utilizing 0.01 percent of carboxy methyl cellulose and 0.012 percent of protecting agent (soda ash) in a 1% salt solution. Therefore, if salt had been applied to a snow or ice covered non-air-entrained concrete surface and the resultant brine solution was equivalent to a 1% salt solution, a 52% reduction in surface spalling could be achieved.

The effects of carboxy methyl cellulose and protecting agent in air-entrained concrete which is in contact with various salt solutions are shown in Examples 6 and 7. Here the carboxy methyl cellulose and soda ash were present in amounts of 0.025 and 0.030 percent by weight. Again a marked reduction in surface spalling was achieved.

Examples 12, 13, 14 and 19 show the reduction in surface spalling on various concrete surfaces in the presence of a brine solution when a low molecular weight, a medium molecular weight, a high molecular weight, and a substituted carboxy methyl cellulose were used, respectively. Note that each of the tests was made using the various form of sodium carboxy methyl cellulose as commercially available from duPont.

Example 24 shows the results of using ratios varying from 1 to 20, to 1.2 to 1 of soda ash to sodium carboxy methyl cellulose (Na CMC) where the compound is used in the presence of urea as opposed to sodium chloride as the road or surface de-icing agent. It should be noted that the spalling loss in Example 24 shows that if an excess amount of carboxy methyl cellulose (CMC) is used, the same effects can be achieved utilizing a more evenly balanced ratio of protecting agent to CMC, as reflected by the 1.2 to 1 test ratio. As the cost of the carboxy methyl cellulose is a restrictive factor, it would be preferred to use a more balanced ratio of the carboxy methyl cellulose to protecting agent and thereby reduce the requirement for the carboxy methyl cellulose.

Considering that during an ice or snow storm a urea de-icer was spread on a highway surface and the melt resulted in a solution containing 4.4 percent urea which was absorbed in the surface pores of the road, Example 21 reflects that the addition of 0.044 percent by weight of sodium carboxy methyl cellulose and 0.053 percent by weight of a protecting agent (soda ash) resulted in a reduction of surface spalling of 58%. Example 22 shows a reduction in surface spalling of 87% when the carboxy methyl cellulose and soda ash are present in percentages by weight of 0.005 and 0.025, respectively, and when applied to a surface having an effective percentage of 1% urea in water solution. In Example 23 a 97% reduction in spalling was attained when 0.010 and 0.025 percent by weight of sodium carboxy methyl cellulose and protecting agent, respectively, were applied to a surface having an effective 1% urea in water solution.

In instances where the road de-icing agent to be used is a blend or mixture of urea and salt, similar reductions in surface spalling are achieved by using varying amounts of carboxy methyl cellulose and protecting agent as shown in the tests of Examples 25 and 27. In Example 25, the percent by weight of the carboxy methyl cellulose and soda ash were held constant at 0.05 percent each. The ratio of urea to salt in solution was varied from ratios of 1.1 to 1.875, to 4.4 to 0.00 urea to salt, respectively.

In application, the carboxy methyl cellulose which may be blended with varying amounts of protecting agent may be applied directly to concrete and bituminous concrete roads and similar surfaces so as to be present when ice, snow, or water is on such surfaces and subjected to freezing temperatures. Conventional spreading equipment may be used to apply a fairly even deposit of the spalling protection compound blend over the concrete surface. As the temperature drops below freezing, the carboxy methyl cellulose will be present in a soluble state to protect against and reduce freeze-thaw damage.

As previously discussed, road salts used during winter storms to melt snow and ice may or may not have a deleterious effect on various concrete surfaces. The damage effect of salts on non-air-entrained concretes will be reduced by the application of the carboxy methyl cellulose and protecting agent compound to the brine solution which results as the snow and ice on the road surface melts. Further, if salt is applied to air-entrained concrete surfaces, the addition of the carboxy methyl cellulose compound will have an additive effect or even further reduce the amount of surface spalling.

Due to the adverse effects of salts to some concrete surfaces, as well as the beneficial effect to vegetation growing beside a road, ureas are frequently applied to road surfaces as a de-icing agent or material. If the carboxy methyl cellulose compound is applied in the presence of the urea solution on the roadway surface, the amount of spalling will also be reduced, as discussed above.

One of the objectives of this invention is to decrease the amount of work and costs encountered with having to first deposit de-icing materials on a surface and subsequently spread a layer of spalling reducing agent to the same surface. Therefore, it would be advantageous to mix the spalling reducing agent with the salt or urea de-icing agent prior to a surface application. This is relatively easy to accomplish in a dry state if only the carboxy methyl cellulose is to be mixed with the salt, urea, or blends or salts and ureas, as the powdery chractersitics of the carboxy methyl cellulose allows it to cling to the particles of such material. If it is found that a dry mix does allow too much segregation of these materials, an excellent mix can be achieved by putting the salt or urea in a mixer, wetting the surface of the salt or urea with one to ten percent of water, depending upon the particle size (surface area) of the salt or urea, and then while mixing, slowly adding the carboxy methyl cellulose thereto and continuing to mix until the carboxy methyl cellulose is evenly distributed over the surface of the salt or urea.

A sucessful method of adding both the protecting agent and the carboxy methyl cellulose to the salt or urea is to put the protecting agent, such as soda ash, into solution in warm water, using sufficient water to wet the surface of the salt or urea and to put the protecting agent into solution. This is about one to ten percent of the weight of salt or urea, depending upon the particle size (surface area) of the salt or urea and upon the solubility of the protecting agent. Add this solution of protecting agent and warm water to the salt or urea which has been previously put into a mixer and continue mixing until the solution has been evenly distributed over the surface of the salt or urea and then while mixing slowly adding the carboxy methyl cellulose to the mix. Continue to blend until the carboxy methyl cellulose is evenly distributed over the surface of the salt or urea.

In wetting the surface of the salt, care should be taken to only add sufficient water or water and protecting agent solution to just wet the surface of the salt or urea and not use so much water or solution that the mixture loses its free flowing characteristics.

Such a method for applying protecting agent and carboxy methyl cellulose, because of the low solubility of the protecting agent in water, may limit the amount of protecting agent which can be added to the salt or urea. If it is found that more protecting agent is necessary than can be applied in this manner, it would be necessary to use more protecting agent solution and to then dry the mixture in a drier. The drier could be a drum drier, hearth drier, fluid bed drier, etc. In drying the mixture, the water content should be reduced only to the point that the product becomes free flowing.

Example 20 is illustrative of one formulation of combining the carboxy methyl cellulose, protecting agent, and salt together to form a uniform and free flowing combined de-icing and spalling protecting compound. Example 26 is illustrative of another method of combining carboxy methyl cellulose, a protecting agent, and urea to form a de-icing and spalling protecting compound.

Example 27 is similar to Examples 20 and 26 and includes a formulation for de-icing and protecting from surface spalling which consists of a carboxy methyl cellulose, urea, salt, and a protecting agent.

The specific formulation of the resultant compounds may vary dependent upon the type of concrete, air-entrained as opposed to non-air-entrained, type and solubility of protecting agent, clamatic conditions, and costs. The examples as a whole are characteristic of a variety of various formulations which can be prepared by the steps of Examples 20, 26 and 27. The various percentages by dry weight have been noted in most examples.

In preparing a dry blend of de-icing and spalling reducing agents, the amount of carboxy methyl cellulose and protecting agent should be present in amounts generally not less than 0.90 and 1.2 percent by weight, respectively, and generally would not exceed 26.6 to 32.0 percent by weight, respectively, when combined with salt. The amount of salt may vary between approximately 41 to 98 percent. The percent dry weight (% DW) of each ingredient with respect to the total dry weight of the respective blends are indicated in the examples. A preferred blend would include between approximately 1 to 3 percent carboxy methyl cellulose, between 1.0 and 7.0 percent protecting agent, and between approximately 90 to 98 percent salt.

Likewise, when blending dry mixes with urea, the ranges of percent by weight of carboxy methyl cellulose and protecting agent should be within 0.5 to 9.0 and 0.5 to 2.4, respectively. Note, however, that generally the lesser the amount of the protecting agent, the greater the need for increased amounts of carboxy methyl cellulose. Further, when wet blending is necessary, 1 to 10% of water may be necessary in each batch dependent upon the factors discussed above.

As shown in Examples 25 and 27, blends of salt, urea, protecting agent and carboxy methyl cellulose are also possible. The percentages of carboxy methyl cellulose and protecting agent are within the limits discussed above, however, the ratio of salt to urea may vary between extremely wide ranges.

In those instances where it is desired to produce a spalling reducing agent which by itself could be deposited on a concrete or bituminous concrete surface so as to be present when ice, snow, water, or a water based solution (brine and urea in water) is present, and subject to a freeze-thaw cycle, the sodium carboxy methyl cellulose and protecting agent such as soda ash may be blended together to form a composition having ratios in percent by weight varying between 1 to 1 (Example 25), 20 to 1 (Example 24), or 1 to 7 (Example 17), respectively. Preferably the ratios by percent weight of carboxy methyl cellulose to protecting agent should be approximately 1.0 to 1.0, to 1.0 to 1.5, respectively, with 1.0 to 1.2 being optimum. Examples 1 and 9 reflect blends of carboxy methyl cellulose and soda ash having approximately 45.5% by weight carboxy methyl cellulose and 54.5% by weight soda ash.

As previously discussed, although the addition of a protecting agent is normally desirable in order to maintain the carboxy methyl cellulose in a soluble state, it could be possible to blend the sodium carboxy methyl cellulose with salt or urea as shown in Example 2 in which 2.4% by dry weight of carboxy methyl cellulose was mixed with 97.6% by dry weight salt.

In use of the composition of a carboxy methyl cellulose and protecting agent, or of the dry de-icing and spalling reducing blend, when weather conditions are such that water, snow or ice is in contact with a concrete or bituminous concrete surface so that water is capable of being absorbed into the surface pores of the concrete, the compositions are evenly distributed over the surfaces by use of conventional equipment so as to be present when ambient temperatures drop below freezing. The presence of the carboxy methyl cellulose will reduce the spalling damage to the surface; the protecting agent will permit the carboxy methyl cellulose to remain soluble by reacting with the calcium and other cations present; and if the de-icing agent is used simultaneously, snow and ice buildup is retarded.

In conducting the following tests, various factors which affect the performance of concrete have been considered: water to cement ratio, cement content, cement type, air entrainment, workability, thorough mixing, proper placing and consolidation, curing time, temperature and humidity. In order to eliminate, as much as possible, the variables that occur in the concrete, all comparative freeze-thaw tests were made on the same batches of concrete in the same freeze-thaw machine at the same time. The concrete test pieces were all poured from the same batch and after being poured into 3×3×16 inch molds, they were placed on a common platform and the platform was vibrated for 15 seconds in order to achieve equal consolidation. The test pieces were then cured in a 72° F. and 100% relative humidity curing room. After curing in this atmosphere, they were then allowed to finish their cure at room temperature and humidity. The portland cement concrete was made from batches which contained the equivalent of 500 pounds of cement and 300 pounds of water per cubic yard. The aggregate was 40% sand and 60% gravel. The slump was less than four inches. The air-entrained batches contained a minimum of 7% entrained air.

The bituminous concrete samples were prepared by the Marshall Method. All comparative freeze-thaw tests were made on samples which were mixed in the same batch. The batches were mixed for two minutes at 270° to 295° F. in a Blakesley Mixer. The compaction was made in a Marshall Compactor at 270° to 280° F. and each set of samples, on which comparative freeze-thaw tests were run, received the same number of flows. The percent of compaction achieved is listed for each test piece.

EXAMPLE 1

Example of using carboxy methyl cellulose in water without salt. Non-air-entrained concrete. 132 freeze-thaw cycles with the lowest probe temperature of the cycle of 28° F.**

| Composition of Test Solutions - % by wt. | Grams Spalling Loss | % Spalling Saved Compared to | | % DW* |
|---|---|---|---|---|
| | | 1.0% Salt Soln. | Distilled Water | |
| Specimen #1 | | | | |
| NaCMC | .025 | | | 45.5 |
| Soda Ash | .030 | | | 54.5 |
| Distilled Water | 99.945 | | | |
| Total | 100.000 | 36.4 | 38% | |
| Specimen #2 | | | | |
| Distilled Water | | 59.0 | | |

*% DW - indicates in this and other examples the approximate percent by weight of each ingredient in a dry mix of such ingredient prior to application to a surface. See Examples 20, 26, and 27 for processes of preparing dry mixes.
Note that carboxy methyl cellulose without salt protects the concrete against spalling.

EXAMPLE 2

Example of using carboxy methyl cellulose with salt but no protecting agent. Non-air-entrained concrete. 25 freeze-thaw cycles with the lowest probe temperature of the cycle at 0° F.**

| Composition of Test Solutions - % by wt. | Grams Spalling Loss | % Spalling Saved Compared to | | % DW |
|---|---|---|---|---|
| | | 1.0% Salt Soln. | Distilled Water | |
| Specimen #1 | | | | |
| NaCMC | .025 | | | 2.4 |
| NaCl | 1.000 | | | 97.6 |
| Distilled Water | 98.975 | | | |
| Total | 100.000 | 364 | 16% | |
| Specimen #2 | | | | |
| NaCl | 1.0 | | | |
| Distilled Water | 99.0 | | | |
| Total | 100.0 | 435 | | |

Note that the carboxy methyl cellulose without the protecting agent is able to give the concrete improved protection against spalling.

** It was found on this particular Cordon Type Freeze-Thaw Machine that when the lowest probe temperature reading was 26° F. the temperature of the solution surrounding the test piece was about 18° F. and the temperature of the freezing plate was about −10° F. At a probe temperature of 28° F., the solution temperature was about 20° F. and the plate temperature was about −8° F. By extrapolating this same −36° F. difference between the probe temperature and the plate temperature and −8° F. difference between the probe temperature and the solution temperature, it is estimated that when the probe temperature was 0° F., the freezing plate temperature was −36° F. and the solution temperature was −8° F.

EXAMPLE 3

Example of using 250 ppm of sodium carboxy methyl cellulose, 300 ppm of soda ash protecting agent and 2.5% salt. Non-air-entrained concrete. 132 freeze-thaw cycles with the lowest probe temperature of the cycle at 28° F.**

| Composition of Test Solutions - % by wt. | | Grams Spalling Loss | % Spalling Saved Compared to | | % DW |
|---|---|---|---|---|---|
| | | | 2.5% Salt Soln. | Distilled Water | |
| Specimen #1 | | | | | |
| NaCl Equivalent* | (2.5) | | | | |
| NaCl | 2.48 | | | | |
| NaCMC | .025 | | | | 97.8 |
| Soda Ash | .030 | | | | 1.0 |
| Distilled Water | 97.465 | | | | 1.2 |
| Total | 100.000 | 22.7 | 79% | 61% | |
| Specimen #2 | | | | | |
| Distilled Water | 100.0 | 59.0 | 47% | | |
| Specimen #3 | | | | | |
| NaCl | 2.5 | | | | |
| Distilled Water | 97.5 | | | | |
| Total | 100.0 | 109.0 | | | |

Note the reduction in spalling when the combination of carboxy methyl cellulose and protecting agent, soda ash, is used. Also note that at this concentration of salt on non-air-entrained concrete the salt solution is more destructive than distilled water.

$$\text{NaCl equivalent} = \left[\frac{\frac{\text{weight of salt}}{MW \text{ of salt}}}{\text{No. of ions or molecules}}\right] \times \frac{MW \text{ of NaCl}}{2}$$

$$= \left[\frac{\frac{\text{weight of salt}}{MW \text{ of salt}}}{\text{No. of ions or molecules}}\right] \times 29.2$$

As an example, soda ash has a molecular weight of about 106 and on dissociation produces somewhat less than 3 ions per molecule. If 300 ppm is equal to the following:

$$\frac{300}{106/3} \times 29.2 = 248 \text{ ppm or } 0.0248\%$$

If 300 ppm of soda ash is to be used in an equivalent 2.5% NaCl solution, the actual amount of NaCl to be added would be 2.5%−0.02%=2.48%.

EXAMPLE 4

Example of test with 100 ppm of sodium carboxy methyl cellulose, 120 ppm of protecting agent (soda ash) and 1.0% salt. Non-air-entrained concrete 132 freeze-thaw cycles with lowest probe temperature of the cycle of 28° F.**

| Composition of Test Solutions - % by wt. | | Grams Spalling Loss | % Spalling Saved compared to | | % DW |
|---|---|---|---|---|---|
| | | | 1.0% Salt Soln. | Distilled Water | |
| Specimen #1 | | | | | |
| NaCl Equivalent* | (1.0) | | | | |
| NaCl | .99 | | | | |
| NaCMC | .010 | | | | 97.8 |
| Soda Ash | .012 | | | | 1.0 |
| Distilled Water | 98.988 | | | | 1.2 |
| Total | 100.000 | 54.5 | 52% | 8% | |
| Specimen #2 | | | | | |
| Distilled Water | 100.0% by wt. | 59.0 | 48% | | |
| Specimen #3 | | | | | |
| NaCl | 1.0 | | | | |
| Distilled Water | 99.0 | | | | |
| Total | 100.0 | 113.6 | | | |

Note that at 100 ppm of sodium carboxy methyl cellulose, it is still effective in preventing damage to the concrete. Comparing Example 4 with Example 3, note that the 100 ppm level is not as effective as the 250 ppm level. Also note that at this 1.0% salt level, the salt solution is more destructive to the non-air-entrained concrete than is the distilled water.

EXAMPLE 5

Example of a test with 250 ppm of sodium carboxy methyl cellulose, 3000 ppm of protecting agent (soda ash) and 2.5% salt. Nonair-entrained concrete. 132 freeze thaw cycles with the lowest probe temperature of the cycle at 28° F.**

| Composition of Test Solutions - % by wt. | | Grams Spalling Loss | % Spalling Saved Compared to | | % DW |
|---|---|---|---|---|---|
| | | | 2.5% Salt Soln. | Distilled Water | |
| Specimen #1 | | | | | |
| NaCl Equivalent* | (2.5) | | | | |
| NaCl | 2.25 | | | | 87.4 |
| NaCMC | .025 | | | | 1.0 |
| Soda Ash | .300 | | | | 11.6 |
| Distilled Water | 97.425 | | | | |
| Total | 100.000 | 50 | 54% | 14% | |
| Specimen #2 | | | | | |
| Distilled Water | 59 | 47% | | | |
| Specimen #3 | | | | | |
| NaCl | 2.5 | | | | |
| Distilled Water | 97.5 | | | | |
| Total | 100.0 | 109 | | | |

Note at this high ratio of protecting agent, 12 parts to one part of sodium carboxy methyl cellulose, the carboxy methyl cellulose is still effective in preventing damage to the concrete. Also note that salt at this concentration is more destructive to nonair-entrained concrete than is distilled water.

EXAMPLE 6

Example of a test with 250 ppm of sodium carboxy methyl cellulose, 300 ppm of protecting agent (soda ash) and 1.0% salt. Air-entrained concrete. 395 freeze thaw cycles with the lowest probe temperature of the cycle at 28° F.**

| Composition of Test Solutions - % by wt. | | Grams Spalling Loss | % Spalling Saved Compared to | | % DW |
|---|---|---|---|---|---|
| | | | 2.5% Salt Soln. | Distilled Water | |
| Specimen #1 | | | | | |
| NaCl Equivalent* | (1.0) | | | | |
| NaCl | .99 | | | | 94.7 |
| NaCMC | .025 | | | | 2.4 |
| Soda Ash | .030 | | | | 2.9 |
| Distilled Water | 98.955 | | | | |
| Total | 100.000 | 0.7 | 83% | 96% | |
| Specimen #2 | | | | | |
| Distilled Water | 100.0 | 18.3 | | | |
| Specimen #3 | | | | | |

-continued

| Composition of Test Solutions - % by wt. | Grams Spalling Loss | % Spalling Saved Compared to | | % DW |
|---|---|---|---|---|
| | | 2.5% Salt Soln. | Distilled Water | |
| NaCl | 1.0 | | | |
| Distilled Water | 99.0 | | | |
| Total | 100.0 | 4.2 | | 77% |

Note characteristic of salt to help prevent damage to air-entrained concrete as well as characteristic of carboxy methyl cellulose with protecting agent (soda ash) to give additional protection.

EXAMPLE 7

Example of a test with 250 ppm of sodium carboxy methyl cellulose, 300 ppm of protecting agent (soda ash) and 2.5% salt. Air-entrained concrete. 395 cycles at 28° F. and 524 cycles at 0° F.**

| Composition of Test Solutions - % by wt. | Grams Spalling Loss | % Spalling Saved Compared to | | % DW |
|---|---|---|---|---|
| | | 2.5% Salt Soln. | Distilled Water | |
| Specimen #1 | | | | |
| NaCl Equivalent | (2.5) | | | |
| NaCl | 2.48 | | | 97.8 |
| NaCMC | .025 | | | 1.0 |
| Soda Ash | .030 | | | 1.2 |
| Distilled Water | 97.465 | | | |
| Total | 100.000 | 6.1 | 76% | 94% |
| Specimen #2 | | | | |
| Distilled Water | 100.000 | 99.6 | | |
| Specimen #3 | | | | |
| NaCl | 2.5 | | | |
| Distilled Water | 97.5 | | | |
| Total | 100.0 | 25.9 | | 75% |

Note characteristic of salt to prevent damage to air-entrained concrete as well as characteristic of carboxy methyl cellulose with a protecting agent to give additional protection.

EXAMPLE 8

Example of a test with 23.1% salt solution as compared with a 2.5% salt solution. No comparing distilled water test was run. Nonair-entrained concrete. 249 freeze thaw cycles with the lowest probe temperature of the cycle at 26° F.**

| Composition of Test Solutions - % by wt. | Grams Spalling Loss | Percent of Spalling Saved as Compared to 2.5% Salt Solution |
|---|---|---|
| Specimen #1 | | |
| NaCl | 23.1 | |
| Distilled Water | 76.9 | |
| Total | 100.0 | 0.14 | 99% |
| Specimen #2 | | |
| NaCl | 2.5 | |
| Distilled Water | 97.5 | |
| Total | 100.0 | 9.5 | |

Note that when the salt concentration is 23.1%, 99% of the spalling is saved as compared with a 2.5% salt solution. This is on a nonair-entrained concrete. On a separate test, distilled water saved only 47% of the spalling as compared with a 2.5% salt solution and 48% as compared with a 1.0% salt solution. Thus, at these test temperatures, apparently salt causes maximum spalling on nonair-entrained concrete at a concentration of about 1.0% to 2.5% salt and the rate of spalling then decreases as the salt concentration increases until about zero spalling occurs at the eutectic salt concentration of 23.1%.

EXAMPLE 9

Example of using a high level of carboxy methyl cellulose, 10,000 ppm of carboxy methyl cellulose, plus a salt equivalent from soda ash of 0.99%. Nonair-entrained concrete. 249 freeze thaw cycles at a probe temperature of 26° F. (This was a different batch of concrete than Example 8 and cannot be compared with Example 8).

| Composition of Test Solutions - % by wt. | Grams Spalling Loss | Percent of Spalling saved as Compared 99% Salt Solution | % DW |
|---|---|---|---|
| Specimen #1 | | | |
| NaCl Equivalent* | (.99) | | |
| NaCl | .00 | | |
| NaCMC | 1.00 | | 45.5 |
| Soda Ash | 1.20 | | 54.5 |
| Distilled Water | 97.80 | | |
| Total | 100.00 | 4.9 | 99% |
| Specimen #2 | | | |
| NaCl | .99 | | |
| Distilled Water | 99.01 | | |
| Total | 100.00 | 367 | |

Note that a high level of carboxy methyl cellulose and protecting agent saved 99% of the spalling which occurred on a 1% salt solution.

EXAMPLE 10

Example of using a high level of carboxy methyl cellulose, 9840 ppm, 11810 ppm of soda ash protecting agent, and 2.5% of equivalent NaCl. Same batch of concrete as Example 9. Nonair-entrained concrete. 249 freeze thaw cycles with the lowest probe temperature of the cycle at 26° F.**

| Composition of Test Solutions - % by wt. | Grams Spalling Loss | Percent of Spalling Saved as Compared to 2.5% Salt Solution | % DW |
|---|---|---|---|
| Specimen #1 | | | |
| NaCl Equivalent | (2.5) | | |
| NaCl | 1.53 | | 41.4 |
| NaCMC | .984 | | 26.6 |
| Soda Ash | 1.181 | | 32.0 |
| Distilled Water | 96.305 | | |
| Total | 100.000 | 3.5 | 98.5% |
| Specimen #2 | | | |
| NaCl | 2.5 | | |
| Distilled Water | 97.5 | | |
| Total | 100.0 | 230.6 | |

Note that a high level of carboxy methyl cellulose and a high level of protecting agent in an equivalent 2.5% salt solution, saved 98.5% of the spalling which occurred in the plain 2.5% salt solution.

EXAMPLE 11

Example of using carboxy methyl cellulose protecting agent and salt on bituminous concrete. Bituminous concrete with 4.75% asphalt and average compaction of 95.3% 315 freeze thaw cycles with the lowest probe temperature of the cycle at 28° F.**

| Composition of Test Solution - % by weight | Grams Spalling Loss | Percent of Spalling Saved as Compared to 2.5% Salt Solution | % DW |
|---|---|---|---|
| Specimen #1 | | | |
| 95.8% Compaction | | | |
| NaCl Equivalent* | (2.5) | | |
| NaCl | 2.48 | | 97.8 |
| NaCMC (DuPont R-75-XII) | .025 | | 1.0 |
| Soda Ash | .030 | | 1.2 |
| Distilled Water | 97.465 | | |
| Total | 100.000 | 0.8 | 98% |

| Composition of Test Solutions - % by weight | | Grams Spalling Loss | Percent of Spalling Saved as Compared to 2.5% Salt Solution | % DW |
|---|---|---|---|---|
| Specimen #2 94.6 Compaction | | | | |
| NaCl Equivalent* | (2.5) | | | |
| NaCl | 2.49 | | | 98.1 |
| NaCMC (DuPont R-75-XII) | .0175 | | | .7 |
| Soda Ash | .030 | | | 1.2 |
| Distilled Water | 97.4715 | | | |
| Total | 100.0000 | 1.8 | 96% | |
| Specimen #3 95.4% Compaction | | | | |
| NaCl | 2.5 | | | |
| Distilled Water | 97.5 | | | |
| Total | 100.0 | 46.1 | | |

Note that this system of reducing the damage caused by the freezing and thawing of brine solutions is at least as effective, if not more effective on bituminous concrete than it is on portland cement concrete.

EXAMPLE 12

Example of using a low molecular weight carboxy methyl cellulose with a protecting agent, soda ash, and 2.5% salt. Nonair-entrained concrete. 330 freeze thaw cycles with the lowest probe temperature of the cycle at 26° F.**

| Composition of Test Solutions - % by wt. | | Grams Spalling Loss | Percent of Spalling Saved as Compared to 2.5% Salt Solution | % DW |
|---|---|---|---|---|
| Specimen #1 | | | | |
| NaCl Equivalent* | (2.5) | | | |
| NaCl | 2.48 | | | 97.8 |
| NaCMC (DuPont R-75-l) | .025 | | | 1.0 |
| Soda Ash | .030 | | | 1.2 |
| Distilled Water | 97.465 | | | |
| Total | 100.000 | 20.4 | 92.4% | |
| Specimen #2 | | | | |
| NaCl | 2.5 | | | |
| Distilled Water | 97.5 | | | |
| Total | 100.0 | 268.8 | | |

Note that low molecular weight carboxy methyl cellulose is also effective in preventing or reducing the spalling caused by freezing and thawing. Comparing these results with Example 19, the low molecular weight carboxy methyl cellulose is equal or more effective than the high molecular weight material.

EXAMPLE 13

Example of using a medium molecular weight carboxy methyl cellulose with a soda ash protecting agent and 2.5% salt. Nonair-entrained concrete. 330 freeze thaw cycles with the lowest probe temperature of the clcle at 26° F.**

| Composition of Test Solutions - % by wt. | | Grams Spalling Loss | Percent of Spalling Saved as Compared to 2.5% Salt Solution | % DW |
|---|---|---|---|---|
| Specimen #1 | | | | |
| NaCl Equivalent* | (2.5) | | | |
| NaCl | 2.48 | | | 97.8 |
| NaCMC (DuPont T-75-m) | .025 | | | 1.0 |
| Soda Ash | .030 | | | 1.2 |
| Distilled Water | 97.465 | | | |
| Total | 100.000 | 12.6 | 95.3 | |
| Specimen #2 | | | | |
| NaCl | 2.5 | | | |
| Distilled Water | 97.5 | | | |
| Total | 100.0 | 268.8 | | |

Note, comparing these results with Example 19, medium molecular weight carboxy methyl cellulose is as effective, if not more effective than the high molecular weight carboxy methyl cellulose.

EXAMPLE 14

Example of using a substituted carboxy methyl cellulose with a protecting agent and salt. Nonair-entrained concrete. 330 freeze thaw cycles with the lowest probe temperature of the cycle at 26° F.**

| Composition of Test Solutions - % by wt. | | Grams Spalling Loss | Percent of Spalling Saved as Compared to 2.5% Salt Solution | % DW |
|---|---|---|---|---|
| Specimen #1 | | | | |
| NaCl Equivalent* | (2.5) | | | |
| NaCl | 2.48 | | | 97.8 |
| NaCMC (DuPont R-75-SII) | .025 | | | 1.0 |
| Soda Ash | .030 | | | 1.2 |
| Distilled Water | 97.465 | | | |
| Total | 100.000 | 34.8 | 87.1% | |
| Specimen #2 | | | | |
| NaCl | 2.5 | | | |
| Distilled Water | 97.5 | | | |
| Total | 100.0 | 268.8 | | |

Note, comparing these results with Example 19, the substituted carboxy methyl cellulose appears to be about as effective in preventing or reducing spalling as the regular high molecular weight carboxy methyl cellulose.

EXAMPLE 15

Example of using an inorganic protecting agent, tetrasodium pyrophosphate, which sequesters the calcium to hold it out of the solution, plus carboxy methyl cellulose and salt. Nonair-entrained concrete. 330 freeze thaw clcles with the lowest probe temperature of the cycle at 26° F.**

| Composition of Test Solutions - % by wt. | | Grams Spalling Loss | Percent of Spalling Saved as Compared to 2.5% Salt Solution | % DW |
|---|---|---|---|---|
| Specimen #1 | | | | |
| NaCl Equivalent* | (2.5) | | | |
| NaCl | 2.49 | | | 92.6 |
| NaCMC (DuPont R-75-XII) | .025 | | | .9 |
| TSPP | .174 | | | 6.5 |
| Distilled Water | 97.311 | | | |
| Total | 100.000 | 57.7 | 78.6% | |
| Specimen #2 | | | | |
| NaCl | 2.5 | | | |
| Distilled Water | 97.5 | | | |
| Total | 100.0 | 268.8 | | |

Note, this is an example of the effectiveness of a class of inorganic protecting agents which function by sequestering the calcium which may dissolve from the concrete.

EXAMPLE 16

Example of using another inorganic protecting agent, sodium phosphate, which precipitates the calcium from the solution plus carboxy methyl cellulose and salt. Nonair-entrained concrete. 330 freeze thaw cycles with the lowest probe temperature of the cycle at 26° F.**

| Composition of Test Solutions - % by Wt. | | Grams Spalling Loss | Percent of Spalling Saved as Compared to 2.5% Salt Solution | % DW |
|---|---|---|---|---|
| Specimen #1 | | | | |
| NaCl Equivalent* | (2.5) | | | |
| NaCl | 2.49 | | | 96.5 |
| NaCMC (DuPont R-75-XII) | .025 | | | 1.0 |
| DSP | .065 | | | 2.5 |
| Distilled Water | 97.420 | | | |
| Total | 100.000 | 65.7 | 75.6% | |
| Specimen #2 | | | | |
| NaCl | 2.5 | | | |
| Distilled Water | 97.5 | | | |
| Total | 100.0 | 268.8 | | |

Note, this is another example of the effectiveness of a class of inorganic protecting agents which function by precipitating the calcium which may be dissolved from the concrete.

EXAMPLE 17

Example of using an organic protecting agent, tetrasodium ethylene diamine tetraacetate which chelates the calcium to hold it out of the solution plus carboxy methyl cellulose and salt. Nonair-entrained concrete. 330 freeze thaw cycles with the lowest probe temperature of the cycle at 26° F.**

| Composition of Test Solutions - % by wt. | | Grams Spalling Loss | Percent of Spalling Saved as Compared to 2.5% Salt Solution | % DW |
|---|---|---|---|---|
| Specimen #1 | | | | |
| NaCl Equivalent* | (2.5) | | | |
| NaCl | 2.49 | | | 92.8 |
| NaCMC (DuPont R-75-XII) | .025 | | | 1.0 |
| Na4EDTA | .167 | | | 6.2 |
| Distilled Water | 97.318 | | | |
| Total | 100.000 | 21.2 | 92.1% | |
| Specimen #2 | | | | |
| NaCl | 2.5 | | | |
| Distilled Water | 97.5 | | | |
| Total | 100.0 | 268.8 | | |

Note, this is an example of the effectiveness of a class of organic protecting agents which function by chelating or sequestering the calcium which may dissolve from the concrete.

EXAMPLE 18

Example of using an organic protecting agent, sodium oxalate, which precipitates the calcium ions from the solution, plus carboxy methyl cellulose and salt. Nonair-entrained concrete. 330 freeze thaw cycles with the lowest probe temperature of the cycle at 26° F.**

| Composition of Test Solutions - % by wt. | | Grams Spalling Loss | Percent of Spalling Saved as Compared to 2.5% Salt Solution | % DW |
|---|---|---|---|---|
| Specimen #1 | | | | |
| NaCl Equivalent* | (2.5) | | | |
| NaCl | 2.49 | | | 96.6 |
| NaCMC (DuPont R-75-XII) | .025 | | | 1.0 |
| Sodium Oxalate | .063 | | | 2.4 |
| Distilled Water | 97.422 | | | |
| Total | 100.000 | 82.4 | 69.4% | |
| Specimen #2 | | | | |
| NaCl | 2.5 | | | |
| Distilled Water | 97.5 | | | |
| Total | 100.0 | 268.8 | | |

Note, this is an example of the effectiveness of a class of organic protecting agents which function by precipitating the calcium which may dissolve from the concrete.

EXAMPLE 19

Example of using a high molecular weight carboxy methyl cellulose with a protecting agent, soda ash, and 2.5% salt. Nonair-entrained concrete. 330 freeze thaw cycles with the lowest probe temperature of the cycle at 26° F.**

| Composition of Test Solutions - % by wt. | | Grams Spalling Loss | Percent of Spalling Saved as Compared to 2.5% Salt Solution | % DW |
|---|---|---|---|---|
| Specimen #1 | | | | |
| NaCl Equivalent | (2.5) | | | |
| NaCl | 2.48 | | | 97.8 |
| NaCMC (DuPont R-75-XII) | .025 | | | 1.0 |
| Soda Ash | .030 | | | 1.2 |
| Distilled Water | 97.465 | | | |
| Total | 100.000 | 20.4 | 92.4% | |
| Specimen #2 | | | | |
| NaCl | 2.5 | | | |
| Distilled Water | 97.5 | | | |
| Total | 100.0 | 268.8 | | |

Figure 1:
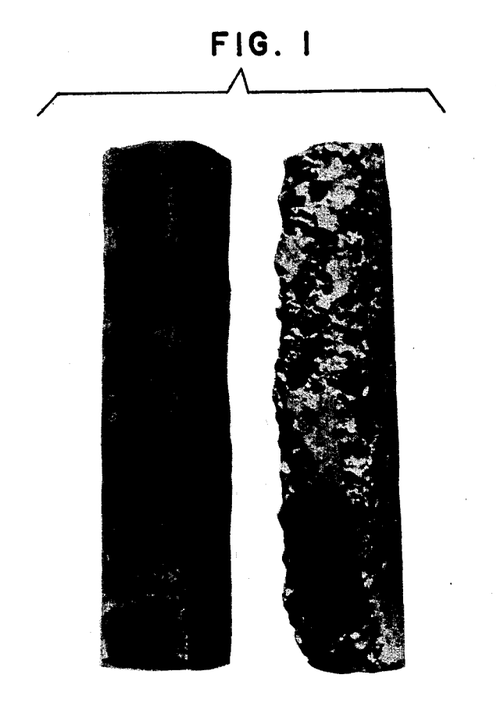
FIG. 1 contrasts in elevation the comparative spalling of concrete with (left) and without (right) the addition of carboxy methyl cellulose.

Note, this is an example of using a high molecular weight carboxy methyl cellulose, soda ash protecting agent and 2.5% salt. This composition is the same as that of much of the other test work which was done and serves as a reference point for the test work in Examples 12 to 18. Specimens 1 and 2 of Example 19 are shown at the left and right respectively in the Figure after testing was completed.

EXAMPLE 20

Example of a method for making a batch of a de-icing mixture which contains salt with soda ash as the protecting agent and DuPont R-75-XH as the source of carboxy methyl cellulose.

The batch which was made, contained ten pounds, dry weight. It was noted that soda ash had a limit of solubility of about 23% in a hot solution. The dry mixture was designed to contain 1.0% sodium carboxy methyl cellulose, with a protecting agent ratio to sodium carboxy methyl cellulose of 1.2 to 1.0. The following percentages and weights were used:

| Name of Chemical | Percent of Dry Weight | Weight | |
|---|---|---|---|
| | | Pounds | Grams |
| DuPont NaCMC R-74-XII) | 1.0 | 0.1 | 45.5 |
| Soda Ash | 1.2 | 0.12 | 54.5 |
| Water | 4.0 | 0.4 | 182.0 |
| Salt (NaCl) | 97.8 | 9.78 | 4440.1 |
| Total | 104.0 | 10.40 | 4722.0 |
| Dry Total | 100.0 | 10.00 | 4540.0 |

The mixing procedure was as follows: 182 grams of boiling water were measured and into this was dissolved 54.5 grams of soda ash. This hot solution was then slowly added to 4440 grams of coarse granular salt while mixing. After the hot solution had been evenly distributed over the surface of the salt, 45.5 grams of sodium carboxy methyl cellulose was slowly added while continuing the mixing process. The carboxy methyl cellulose was picked up by the solution which was clinging to the surface of the salt and formed a uniform and free flowing product.

EXAMPLE 21

Example of how 440 ppm of sodium carboxy methyl cellulose with 530 ppm of soda ash in a 4.4% urea in water solution reduces the freezing damage to concrete which is produced by a plain 4.4% urea in water solution. 58 freeze-thaw cycles, with the lowest probe temperature of the cycle at −18° F.

| Prism No. | Composition of Test Solutions % by weight | | % Spalling Loss | % Spalling Saved by Addition of Sodium Carboxy Methyl Cellulose | % DW* |
|---|---|---|---|---|---|
|   | Urea | 4.4 |   |   |   |
|   | Distilled Water | 95.6 |   |   |   |
| 1 | Total | 100.0 | 3.8 |   |   |
|   | Urea | 4.4 |   |   | 97.8 |
|   | Distilled Water | 95.503 |   |   |   |
|   | NaCMC, duPont R-75-XH | .044 |   |   | 1.0 |
|   | Soda Ash | .053 |   |   | 1.2 |
| 2 | Total | 100.000 | 1.6 | 58 |   |

*See Example 1.
Note that the ratio of urea to sodium carboxy methyl cellulose on Prism No. 2 is 100 to 1.

EXAMPLE 22

Example of how only 50 ppm of sodium carboxy methyl cellulose with 250 ppm of soda ash in a 1.0% urea solution, reduces the freezing damage to concrete which is produced by a plain 1.0% urea in water solution. 58 freeze-thaw cycles with the lowest probe temperature of the cycle at −18° F.

| Prism No. | Composition of Test Solutions % by weight | | % Spalling Loss | % Spalling Saved by Addition of Sodium Carboxy Methyl Cellulose | % DW* |
|---|---|---|---|---|---|
|   | Urea | 1.0 |   |   | 97.1 |
|   | Distilled Water | 98.97 |   |   |   |
|   | NaCMC, duPont R-75-XH | 0.005 |   |   | .5 |
|   | Soda Ash | 0.025 |   |   | 2.4 |
| 3 | Total | 100.000 | 0.4 | 87 |   |
|   | Urea | 1.0 |   |   |   |
|   | Distilled Water | 99.0 |   |   |   |
| 4 | Total | 100.0 | 3.0 |   |   |

Note that the ratio of urea to sodium carboxy methyl cellulose in prism No. 3 is 200 to 1.

EXAMPLE 23

Example of how 100 ppm of sodium carboxy methyl cellulose with 250 ppm of soda ash in a 1.0% urea in water solution reduces the freezing damage produced by a plain 1.0% urea in water solution. 58 freeze-thaw cycles with the lowest probe temperature of the cycle at −18° F.

| Prism No. | Composition of Test Solutions % by weight | | % Spalling Loss | % Spalling Saved by Addition of Sodium Carboxy Methyl Cellulose | % DW* |
|---|---|---|---|---|---|
|   | Urea | 1.0 |   |   |   |
|   | Distilled Water | 99.0 |   |   |   |
| 4 | Total | 100.0 | 3.0 |   |   |
|   | Urea | 1.000 |   |   | 96.6 |
|   | Distilled Water | 98.965 |   |   |   |
|   | NaCMC, duPont R-75-XH | 0.010 |   |   | 1.0 |
|   | Soda Ash | 0.025 |   |   | 2.4 |
| 5 | Total | 100.000 | 0.1 | 97 |   |

Note that the ratio of urea to sodium carboxy methyl cellulose in prism No. 3 is 100 to 1.

EXAMPLE 24

Example of how 500 ppm to 10,000 ppm of sodium carboxy methyl cellulose plus 500 ppm to 1000 ppm of soda ash, $Na_2CO_3$, in a relatively high concentration, 10% of urea in a water solution, reduces the freezing damage produced by a plain 10% urea in water solution. 58 freeze-thaw cycles with lowest probe temperature of the cycle at −18° F.

| Prism No. | % Distilled Water | Percent Urea | Percent Soda Ash (Na$_2$CO$_3$) | Percent duPont R-75-XH (NaCMC) | Percent Spalling Loss | % Spalling Saved by Addition of Sodium Carboxy Methyl Cellulose |
|---|---|---|---|---|---|---|
| 6 | 89.89 | 10.0 | 0.06 | 0.05 | 0.0 | 100 |
| 7 | 89.75 | 10.0 | 0.10 | 0.15 | 0.1 | 97 |
| 8 | 90.0 | 10.0 | 0.00 | 0.00 | 2.9 |  |
| 9 | 88.95 | 10.0 | 0.05 | 1.00 | 0.1 | 97 |

Note: The following are the %s DW (see Example 1) for:

| Prism No. | % Urea | % Soda Ash | % (NaCMC) |
|---|---|---|---|
| 6 | 98.9 | .6 | .5 |
| 7 | 97.5 | 1.0 | 1.5 |
| 8 | 100.0 | — | — |
| 9 | 90.5 | .5 | 9.0 |

Also note that the ratio of urea to sodium carboxy methyl cellulose in these tests varied from 10 to 1 in prism No. 9 down to 200 to 1 in prism No. 6. Prism No. 6 showed a greater resistance to spalling than would be expected and would probably not be typical.

EXAMPLE 25

Example of how the addition of sodium carboxy methyl cellulose plus soda ash to various ratios of urea to salt reduces the freezing damage to concrete. 61 freeze-thaw cycles with the lowest probe temperature of each cycle at −24° F.

| Prism No. | % Distilled Water | % Urea | % Salt | % Soda Ash | % R75XH | % Spalling Loss | % Spalling Saved by Addition of Sodium Carboxy Methyl Cellulose |
|---|---|---|---|---|---|---|---|
| 10 | 97.025 | 1.1 | 1.875 | 0.00 | 0.00 | 1.72 |  |
| 11 | 96.925 | 1.1 | 1.875 | 0.05 | 0.05 | 1.27 | 26 |
| 12 | 96.55 | 2.2 | 1.25 | 0.00 | 0.00 | 0.58 |  |
| 13 | 96.45 | 2.2 | 1.25 | 0.05 | 0.05 | 0.09 | 84 |
| 14 | 96.075 | 3.3 | 0.625 | 0.00 | 0.00 | 3.37 |  |
| 15 | 95.975 | 3.3 | 0.625 | 0.05 | 0.05 | 0.22 | 93 |
| 16 | 95.5 | 4.4 | 0.00 | 0.05 | 0.05 | 1.71 | 62 |
| 17 | 95.6 | 4.4 | 0.00 | 0.00 | 0.00 | 4.52 |  |

Note that in this example, there are compositions in which the ratio of urea to salt varies from 0.59 to 1 up to ∞ to 1 and that in each of these composition pairs, the addition of sodium carboxy methyl cellulose reduced the freezing damage to concrete.

Also note: %s DW (See Example 1) for:

| Prism No. | % Urea | % Soda Ash | % (NaCMC) | % Salt |
|---|---|---|---|---|
| 11 | 35.8 | 1.6 | 1.6 | 61.0 |
| 13 | 62.0 | 1.4 | 1.4 | 35.2 |
| 15 | 82.0 | 1.2 | 1.2 | 15.6 |
| 16 | 97.8 | 1.1 | 1.1 | — |

EXAMPLE 26

Example of a method for making a batch of a de-icing composition which contains, as the de-icing reagent, 97% urea with soda ash as the protecting agent and duPont R-75-XH as the source of sodium carboxy methyl cellulose. Urea has an advantage as a de-icing reagent in that it does not corrode reinforcing steel in concrete and it acts as a plant growth stimulant when it runs onto any soil in which plants are growing. Under similar circumstances, sodium and calcium de-icers may corrode reinforcing steel in concrete and produce chloride toxicity in plants.

The batch contained 10 pounds, dry weight, and 10.35 pounds total weight. It was made by putting 9.7 pounds of urea into a mixer and, while stirring, adding to the urea 0.5 pounds of a 30% soda ash in water solution. To hold this concentration of soda ash in solution, the temperature of the soda ash solution was maintained above 95° F. After the soda ash solution was well dispersed over the surface of the urea, 0.15 pounds of duPont R-75-XH was dusted onto the mixture while stirring and produced a free flowing uniform composition which was used as a de-icing composition to reduce freezing damage to concrete.

| Reagents in De-icing Composition | Weight Percent | Weight Pounds | Grams |
|---|---|---|---|
| Urea | 97.0 | 9.7 | 4400.0 |
| Water | 3.5 | 0.35 | 158.8 |
| Soda Ash | 1.5 | 0.15 | 68.0 |
| duPont R-75-XH | 1.5 | 0.15 | 68.0 |
| Total Weight | 103.5 | 10.35 | 4694.8 |
| Dry Weight | 100.0 | 10.00 | 4536.0 |

EXAMPLE 27

Example of a method for making a batch of a de-icing composition which contains as the de-icing reagents 1.0% urea and 96% salt with soda ash as the protecting agent and duPont R-75-XH as the source of sodium carboxy methyl cellulose. The small amount of urea, in this composition, acts as a plant growth stimulant whenever the solution, formed from melting snow or ice, runs onto soil in which plants are growing.

The batch contained 10 pounds, dry weight, and 10.35 pounds, total weight. It was made by putting 9.6 pounds of salt and 0.1 pounds of urea into a mixer and stirring the mixer until the urea was well dispersed into the salt. In order to achieve a non-segregating mixture of these two reagents, it is important that the two reagents are of about the same particle size. To this mixture was then added, while stirring, 0.5 pounds of a 30% solution of soda ash in water. To hold this concentration of soda ash in solution, the temperature of the soda ash solution was maintained above 95° F. After the soda ash solution was well dispersed over the surface of the salt and urea, 0.15 pounds of duPont R-75-XH was added onto the mixture while stirring and produced a free flowing uniform composition which was used as a de-icing composition to reduce the freezing damage to concrete.

| Reagents in De-icing Composition | Weight Percent | Weight Pounds | Weight Grams |
|---|---|---|---|
| Salt (NaCl) | 96.0 | 9.6 | 4354.6 |
| Urea | 1.0 | 0.1 | 45.4 |
| Water | 3.5 | 0.35 | 158.8 |
| Soda Ash ($Na_2CO_3$) | 1.5 | 0.15 | 68.0 |
| duPont R-75-XH | 1.5 | 0.15 | 68.0 |
| Total | 103.5 | 10.35 | 4694.8 |
| Dry Weight | 100.00 | 10.00 | 4536.0 |

I claim:

1. A spalling reducing composition for application to the surface of cured concrete and bituminous concrete while such surface is subject to the accumulation of water, snow or ice under ambient temperature conditions which are conducive to freezing water absorbed into the porous concrete and bituminous concrete comprising, soluble sodium carboxy methyl cellulose and a protecting agent, said protecting agent having the capacity of reacting with calcium ions in a solution containing such ions so as to aid in maintaining said sodium carboxy methyl cellulose in a soluble state when in the presence of calcium ions, said sodium carboxy methyl cellulose and said protecting agent being present in a range of ratios by weight from approximately 20 parts sodium carboxy methyl cellulose to 1 part protecting agent and from 1 part sodium carboxy methyl cellulose to 7 parts protecting agent.

2. The composition of claim 1 in which the ratio by weight of said sodium carboxy methyl cellulose to said protecting agent is between 1:1 and 1:1.5, respectively.

3. The composition of claim 2 in which the ratio by weight of said sodium carboxy methyl cellulose to said protecting agent is 1:1.2.

4. The composition of claim 1 in which said protecting agent is soda ash.

5. The composition of claim 1 wherein the sodium carboxy methyl cellulose is selected from the group consisting of low molecular weight sodium carboxy methyl cellulose, medium molecular weight sodium carboxy methyl cellulose, high molecular weight sodium carboxy methyl cellulose and substituted sodium carboxy methyl cellulose.

6. The composition of claim 1 wherein the protecting agent is selected from the group consisting of disodium phosphate, tetrasodium pyrophosphate, tetrasodium ethylene diamine tetraacetate, and sodium oxalate.

7. A granular free flowing de-icing and spalling reducing composition for application to the surface of cured concrete and bituminous concrete while such surface is subject to the accumulation of water, ice, or snow under ambient temperature conditions which are conducive to freezing water absorbed into the porous concrete or bituminous concrete, comprising a sodium carboxy methyl cellulose ingredient to prevent spalling of the concrete, a protective agent ingredient, said protecting agent having the capacity of reacting with calcium ions in a solution containing such ions so as to maintain said sodium carboxy methyl cellulose ingredient in a soluble state when in the presence of calcium ions, and a sodium chloride ingredient for causing the ice and snow to melt, said ingredients being mixed in the range of the following percentages by weight:

| | Approx. % by wt. ($\pm$.1%) |
|---|---|
| Sodium carboxy methyl cellulose | 1.0 to 26.6 |
| Protecting Agent | 1.2 to 32.0 |
| Sodium chloride | 97.8 to 41.4 |

8. The composition of claim 7 in which said protecting agent is soda ash.

9. A granular free flowing de-icing and spalling reducing composition for application to water, snow, and ice covering the surface of cured concrete and bituminous concrete under weather conditions which are conducive to freezing the water absorbed into the porous concrete and bituminous concrete comprising, sodium carboxy methyl cellulose, a protecting agent, said protecting agent having the capacity of reacting with calcium ions in a solution containing such ions so as to thereby reduce the possibility of said sodium carboxy methyl cellulose reacting with the calcium ions, and a urea de-icing agent for causing the snow and ice to melt, said sodium carboxy methyl cellulose and said protecting and de-icing agents being present in the composition in ranges of the following percentages by weight:

| | Approx. % by wt. ($\pm$.1%) |
|---|---|
| Sodium carboxy methyl cellulose | .5 to 9.0 |
| Protecting agent | .5 to 2.5 |
| Urea de-icing agent | 99.0 to 90.5 |

10. The composition of claim 9 in which said protecting agent is soda ash.

11. The method of protecting concrete and bituminous concrete which are subject to accumulations of water, snow, and ice from spalling caused by the freezing and thawing of liquids which have been absorbed within the concrete and bituminous concrete comprising, the steps of:

A. dissolving a protecting agent in water to form a saturated solution, said protecting agent having the capability of reacting with calcium ions in a solution containing such ions, B. mixing said protecting agent solution with a de-icing agent selected from the group consisting of urea, sodium chloride, or a combination of urea and sodium chloride to uniformly coat the surface of the de-icing agent to form a mixture, C. blending sodium carboxy methyl cellulose with said mixture to form a uniform granular free flowing blend having a composition in percent by dry weight within the ranges of:

| | Approximate % dry weight of composition ($\pm$.1%) |
|---|---|
| Protecting agent | 32.0 to .5 |
| Sodium Carboxy Methyl Cellulose | 26.6 to .5 |
| De-icing agent | 41.4 to 99.0 |

D. spreading said uniform blend onto the concrete or bituminous concrete surface so as to be present when water, snow, or ice contacts such surface and ambient temperatures are sufficiently low to cause water to freeze.

12. The method of claim 11 including the step of heating said saturated solution to increase the solubility of said protecting agent.

13. The method of claim 11 in which said protecting agent is soda ash.

14. The method of claim 11 including the step of drying said uniform blend to remove excess water therefrom.

15. The method of reducing the amount of spalling damage to cured concrete and cured bituminous concrete subject to the accumulation of water, snow, and ice comprising the steps of:
   A. blending sodium carboxy methyl cellulose and a protecting agent which precipitates, sequesters, or chelates calcium ions in the concrete to form a flowable uniform blend having from approximately 1.0 part sodium carboxy methyl cellulose to 1.0 to 7.0 parts protecting agent,
   B. applying said blend to the concrete or bituminous concrete so as to be present when water, snow, or ice is contacting the same and at a time when ambient temperatures are sufficiently low to freeze water.

16. The method of claim 15 in which said protecting agent is soda ash.

17. The method of claim 15 in which said protecting agent is selected from the group consisting of disodium phosphate, tetrasodium pyrophosphate, tetrasodium ethylene diamine, tetraacetate, and sodium oxalate.

18. A method of reducing the amount of spalling of concrete and bituminous concrete roads, highways, driveways and walkways which results when such surfaces are subject to accumulations of water, snow and ice during ambient temperatures which cause freezing of water based solutions absorbed into the pores of concrete and bituminous concrete comprising the steps of:
   A. applying sodium chloride to the concrete or bituminous concrete to melt ice and snow contacting the surface and thereby forming a brine solution,
   B. spreading soluble sodium carboxy methyl cellulose on said brine solution in amounts equalling 100 to 10,000 ppm sodium carboxy methyl cellulose in the brine solution and so as to be present at a time when ambient temperatures are sufficiently low to cause the brine solution to freeze, whereby the presence of sodium carboxy methyl cellulose reduces the amount of spalling of the concrete or bituminous concrete.

19. A method of reducing the amount of spalling of concrete and bituminous concrete roads, highways, driveways and walkways which results when such surfaces are subject to accumulations of water, snow and ice during ambient temperatures which cause freezing of water based solutions absorbed into the pores of concrete and bituminous concrete comprising the steps of:
   A. mixing sodium carboxy methyl cellulose with a de-icing agent selected from the group of urea, sodium chloride, or a combination of urea and sodium chloride, to form a free flowing blend in which the sodium carboxy methyl cellulose is evenly distributed over the surface of said de-icing agent,
   B. spreading said free flowing blend on the concrete or bituminous concrete so as to be present when water, ice, or snow is contacting the same and at a time when ambient temperatures are sufficiently low to freeze water, whereby the presence of said sodium carboxy methyl cellulose reduces the amount of spalling of the concrete or bituminous concrete.

20. The method of claim 19 including the step of wetting the surface of said de-icing agent with one to ten percent water by weight prior to mixing said sodium carboxy methyl cellulose with said de-icing agent.

21. A granular free flowing de-icing and spalling reducing composition for application to the surface of cured concrete and bituminous concrete while such surface is subject to the accumulation of water, ice, or snow under ambient temperature conditions which are conducive to freezing water absorbed into the porous concrete or bituminous concrete, comprising a sodium carboxy methyl cellulose ingredient to prevent spalling of the concrete, a protective agent ingredient having the capacity of reacting with calcium ions in a solution containing such ions so as to maintain said sodium carboxy methyl cellulose ingredient in a soluble state when in the presence of calcium ions, and a de-icing ingredient for causing the ice and snow to melt selected from the group consisting of sodium chloride, urea, or a mixture of sodium chloride and urea, said sodium carboxy methyl cellulose ingredient being present in the approximate range by weight of 0.5 to 26.6 percent, said de-icing ingredient being present in the approximate range by weight of 41.4 to 99.0 percent, and said protecting agent being present in sufficient amounts to maintain the sodium carboxy methyl cellulose soluble when the composition is applied to the surface of the cured concrete or bituminous concrete.

22. A spalling reducing composition for application to the surface of cured concrete and bituminous concrete while such surface is subject to the accumulation of water, snow, or ice under ambient temperature conditions which are conducive to freezing water absorbed into the porous concrete and bituminous concrete comprising, a dry and freely flowable mixture including soluble sodium carboxy methyl cellulose and a protecting agent having the capacity of reacting with calcium ions in a solution containing such ions so as to aid in maintaining said sodium carboxy methyl cellulose in a soluble state when in the presence of calcium ions, said sodium carboxy methyl cellulose being present in said mixture in amounts by weight generally between 0.5 and 45.5 percent, and said protecting agent being present in said mixture in amounts by weight between approximately 0.5 to 54.5 percent.

23. The composition of claim 22 in which said mixture includes a de-icing agent selected from the group of sodium chloride, urea, or a blend of sodium chloride and urea, said de-icing agent being present when either of said sodium carboxy methyl cellulose or said protecting agent is present in said mixture in amounts by weight less than 45.5 and 54.5 percent, respectively.

* * * * *